United States Patent [19]
Johnson et al.

[11] 3,976,794
[45] Aug. 24, 1976

[54] ENCAPSULATION OF SUGAR AND ITS USE IN SWEETENED COCONUT

[75] Inventors: Lawrence A. Johnson, Medina; Larry A. Walters, Parma, both of Ohio

[73] Assignee: SCM Corporation, New York, N.Y.

[22] Filed: June 3, 1974

[21] Appl. No.: 475,623

[52] U.S. Cl. .................... 426/103; 426/289; 426/292; 426/307; 426/617
[51] Int. Cl.² .................................. A23G 3/00
[58] Field of Search ............ 426/205, 103, 93, 96, 426/199, 307, 201, 214, 288, 378, 377, 289, 292, 617

[56] References Cited
UNITED STATES PATENTS

| | | |
|---|---|---|
| 1,882,476 | 10/1932 | Blinn.............................. 426/103 X |
| 2,144,371 | 1/1939 | Griffith et al.................. 426/103 X |
| 2,225,894 | 12/1940 | White et al..................... 426/103 X |
| 2,502,516 | 4/1950 | Glabe.................................. 426/378 |
| 2,615,812 | 10/1952 | Kaufman et al..................... 426/205 |
| 2,631,104 | 3/1953 | Welker et al....................... 426/205 |
| 3,655,409 | 4/1972 | Glasser ......................... 426/378 X |

*Primary Examiner*—Frank W. Lutter
*Assistant Examiner*—N. Greenblum
*Attorney, Agent, or Firm*—Jerry K. Mueller, Jr.; Merton H. Douthitt

[57] ABSTRACT

Improved sweetened coconut products coated with powdered sugar can be made by substituting for a fraction of said powdered sugar, particles of sugar encapsulated in edible fat.

8 Claims, No Drawings

ENCAPSULATION OF SUGAR AND ITS USE IN SWEETENED COCONUT

BACKGROUND OF THE INVENTION

This invention relates to an improved sweetened coconut product coated with powdered sugar, and more particularly to substituting for a fraction of said powdered sugar, particles of sugar encapsulated in edible fat.

Heretofore, coconut base particles or pieces usually in the form of cuts (medium, macaroon and flakes) and shreds have been sweetened by coating the surface of the coconut particles with sugar. The sugar used to coat the coconut pieces is usually powdered sugar ranging in size, for example, form 6xx to 10xx. Sugar coating is applied to the coconut pieces by conventional machine coating techniques including tumble coating in rotary drum, horizontal rotating screw-type mixers or other similar equipment whereby the coconut base particles are uniformly and densely coated to achieve the desired sweetness level.

The powdered sugar coating has caused problems both in the coating operation itself and in machine packaging the thus-sweetened coconut particles. In general, coconut particles are shipped into the United States in dessicated form with the moisture content being about 3% or less. Prior to marketing, sufficient water is added to raise the moisture content of the coconut to fall between about 3% and 25% and preferably from about 9% to 16% by weight, depending upon the anticipated usage, be it industrial or consumer. The added moisture, particularly in the range of 14% to 18%, produces coconut particles of desirable texture and eating quality. However, the water content of sweetened coconut particles intended for packaging by conventional automatic packaging machinery must be kept low (9% to 14%) because hydrated sugar at higher moisture levels causes the coconut to become very sticky and generally impractical to handle for such packaging. Also the sweetened coconut particles can become sticky in the coating operation due to the heat generated by such coating process. At such higher moisture levels the hydrated sugar coating also can cause stickiness problems for processing machines when the coconut is used as the filler in or coating on some foods.

The coconut base particles can also be colored with various vegetable dyes and flavored with natural and synthetic flavoring agents. The thus colored and flavored coconut particles can then be coated with sugar to impart sweetness to the product in coating operations as above specified. Instead of using heretofore known vegetable dyes as the coloring agent, U.S. patent No. 3,924,016 discloses the use of calcium or aluminum lake as the coloring agent. The disclosure of said application is expressly incorporated herein by reference.

Frequently, also, the uncolored coconut base particles can be off-white, thereby not complying with desired color specifications. A straight powdered sugar coating can impart an additional degree of whiteness to the coconut base particles. However, the thus-coated coconut base particles usually are still below desired color specifications.

Advantages of this invention include the ability to increase water content for desired palatability and storage enhancement while maintaining sweetness and texture of the conventionally sugar coated coconut product, reducing stickiness thereof for machine handling, and improving whiteness of the product.

SUMMARY OF THE INVENTION

One aspect of this invention comprises an edible coconut base particle coated with a mixture of powdered sugar particles and particles of sugar encapsulated in edible fat, the proportion of sugar in said encapsulated sugar particles constituting at least about 5% of the total sugar content of said coating mixture and not substantially in excess of that proportion which will impart a threshold textural difference to the product, the maximum particle size of the preponderance of said encapsulated sugar particles being restricted to about four times the maximum particle size of said powdered sugar particles. Another aspect of this invention is a process for making a sweetened coconut wherein a substantial fraction of its powdered sugar is replaced by such encapsulated sugar.

A further aspect of this invention is a particulate sweetener as a replacement for powdered sugar in foods consisting essentially of particles of sugar encapsulated in edible fat, the maximum particle size of the preponderance of said encapsulated sugar particles being not substantially more than about four times that of the powdered sugar it replaces, the proportion of fat to sugar being from 0.67:1 to 2.33:1 or higher or lower, for example from 100:1 to 0.1:1, the particles being from about 20 to 60 mesh (U.S. Standard) average size, the fat having a Capillary Melting Point of from about 95° to about 150°F.

DETAILED DESCRIPTION OF THE INVENTION

Preparation of the instant coconut usually starts with dessicated coconut particles. To these particles water is added to bring the moisture content to about 3% to 25% and preferably about 12% to 18% by weight. The added moisture produces coconut particles of desirable texture and quality. To inhibit drying of the coconut particles at these moisture levels a suitable humectant is added. Useful humectants are polyhydric alcohols having 3 to 6 carbon atoms as typified by propylene glycol, glycerin, and sorbitol, which are disclosed in U.S. Pat. Nos. 1,382,039 and 2,631,104. The hydrated, humectant-treated coconut particles can then be flavored and colored to achieve the desirable flavor and color of the final coconut particles. Thus, the edible coconut base particle is a hydrated, humectant-treated coconut particle with or without flavorings and coloring, but without a sugar coating.

The coconut base particles then are sweetened by coating said particles with a mixture of powdered sugar particles and particles of sugar encapsulated in edible fat. The encapsulating fat is an edible vegetable fat, animal fat, fatty food emulsifier such as a monoglyceride, diglyceride or a partial glycolate of fatty-forming ($C_{12-26}$) fatty acids, glycerol mixed esters of water soluble hydroxy carboxylic and higher fatty acids, higher fatty acid esters of lactylic acids, sorbitan esters of higher fatty acids, polyoxyalkylene derivatives of sorbitan esters of higher fatty acids, glycol esters of higher fatty acids and their polyoxyalkylene derivative, higher fatty acid esters of polyglycerols and their polyoxyalkylene derivatives, tartaric acid esters of higher fatty acid monoglycerides, stearyl monoglyceridyl citrate, higher fatty acid esters of citric acid such as dipalmityl or distearyl citrate, sucrose esters of higher fatty acids, alkoxylated partial higher fatty esters of polyhydric alcohols having from 2 to 6 carbon atoms, and mixtures of same. Thus, fats for the instant purpose include triglycerides, fatty emulsifiers, and mixtures of same, and especially those which are bland.

Preferably such "fat" is normally hard, although plastic fats (or fat mixtures) can be used. A normaly hard edible fat is one that at 115°F. is dry to the touch, free-flowing in small beaded form, which beads do not tend to agglomerate strongly or appreciably or to deform appreciably, even when standing unpacked to a depth of 6 inches high in a one inch diameter cylinder for 24 hours at 75°–80°. A normally plastic counterpart at 100°F. usually is greasy to the touch, tends to agglomerate at points of contact in small beaded form, and will deform appreciably on like standing for 24 hours, but will not thereby lose much of its generally particulate identity by such flow or by coalescense. By contrast, sticky, usually amorphous, fats usually have appreciable plastic or fluid flow at 75°F., and cannot be beaded readily by themselves at temperatures as low as 40°F.; and normally liquid fats are those having a liquid continuous phase or are entirely liquid at 50°F.

Sticky amorphous and normally liquid fats are best thoroughly intermixed in a matrix of normally solid ones. Such mixture can assume a plastic or plasticized character and can be used for encapsulation for purposes of this application. A preferred normally hard edible fat for purposes of this application is one with a Capillary Melting Point of from about 110° to about 130°. The fat should also be relatively neutral in flavor so that it does not mask or detract from the sweetening effect imparted by the sugar content.

To achieve the desired advantages of this invention the coating mixture of powdered sugar particles and particles of sugar encapsulated in edible fat, the proportion of sugar in said encapsulated sugar particles should constitute at least about 5% of the total sugar content of said coating mixture and not substantially in excess of that proportion which will impart a threshold textural difference to the product. By a threshold textural difference is meant that the majority of a lay test panel would scarcely notice the substitution in casual consumption of the goods, and then not find it objectionable in mouth feel, taste and texture. Obviously, if the encapsulating fat is very high melting, such threshold will tend to be lower than when such fat melts fully at about body temperature and which exhibits a sharp melting pattern as body temperature (98.6°F.) is approached from below. Obviously, also, if one uses 75 parts of fat to encapsulate 25 parts of sugar (sucrose), such threshold could be lower than when a lesser proportion of fat is used for the sugar encapsulation.

Furthermore, because the encapsulated sugar if fairly well protected from surrounding moisture, it is conceivable to use some dextrose, corn syrup solids, or other sugar solids that are less sweet than sucrose with the sucrose in the encapsulated particles. If such use is made, clearly the resulting encapsulated particles can be substantially less sweet and could require significantly more total encapsulated particles to obtain the approximate sweetness of straight powdered sugar that it replaced. Hence, while straight powdered sugar herein means powdered sucrose, the encapsulated sweetener, although preferably all sucrose, can be extended with such solids to a nominal degree (for example up to 15% based on the weight of the total encapsulated sweetener) without departing from the practice of this invention. Artificial sweeteners such as saccharin also can be used in a fat encapsulated particle if desired.

The maximum allowable amount of replacement of the powdered sugar by the encapsulated sugar without a significant textural difference also is dependent upon whether the sweetened coconut is to be ingested straight or with a substrate food (a carrier). The types of carriers will have a marked effect upon the threshold textural difference. If the particular carrier chosen were to have a high fat content, for example, a fat-rich filling or a buttercream icing, then the amount of replacement of straight powdered sugar with fat-encapsulated sugar could be as mush as about 60%. If such carrier were unfrosted baked goods or marshmallows, then the threshold textural difference would be reached at a much lower replacement value of the same encapsulated sugar because the fat could be texturally more noticeable upon ingesting such goods. Generally then such threshold will be between about 20% and 60% replacement of the straight powdered sugar with the encapsulated sugar; although it must be recognized that lower and higher replacement values will be encountered.

For purposes of this application an inventive coconut particle and its conventional counterpart have the same edible coconut base, but the inventive particle will be hydrated to a higher degree; the sugar coatings both will be sucrose in the same weight proportion, but a fraction of the sucrose on the inventive coconut particle will be fat-encapsulated; the inventive coconut particle and its conventional counterpart will have about the same stickiness. Using 25% replacement of straight powdered sugar by inventive particles (having 60 parts fat per 40 parts sugar) on shredded coconut, and one type of conventional automatic packaging machine, the inventive coconut will have about 18% maximum water content optimally for filling versus about 14% for the conventional counterpart; for another type of conventional automatic packaging machine the inventive coconut will have about 14% maximum water content optimally versus about 9%–10% water for the conventional counterpart.

The encapsulated sugar particles can be used as a replacement for straight powdered sugar in a variety of foods. The proportion of 6xx–10xx powdered sugar (sucrose) in the composite fat/sugar particle can be from about 5% to about 40%. When the concentration of fine sugar in melted fat becomes appreciably greater than about 40%, the mixture becomes difficult to comminute as a spray and spray-chill into composite particulates. Generally, for efficiency and economy the encapsulated sugar is formulated to have as high a concentration of sugar as possible. The maximum particle size of the preponderance of the sugar/fat composites should not be substantially more than about four times that of the particle size of the powdered sugar it replaces. If the particle size of too much of the encapsulated sugar particles is too large relative to that of the sugar it replaces, this can be noticeable texturally to even the casual eater. Such encapsulated sugar particles size generally range from about 20 to 150 mesh (United States Standard Sieve Series), but it should be recognized that a very small proportion (2–10%) of the resulting spray-chilled particles will be larger than 20 mesh in normal operation. So long as the preponderance, 90+ percent, of the spray chilled particles are in the desired size range and the larger ones are not grossly larger, but run-of-the-spray, one need not classify the spray chiller output but can use it unclassified.

The fat-encapsulated sugar particles comprising a portion of the coating mixture of the inventive coconut and the fat-encapsulated sugar particles comprising a particulate sweetener replacement for straight powdered sugar in foods also can be made according to the Johnson et al. process of condiment encapsulation by spray-chilling (Ser. No. 493,324), now U.S. patent No. 3,949,094. This represents an improved spray-chilling process for encapsulation of condiment with normally solid lipoidal material wherein a spray of the liquified condiment (in this case sugar) or pumpable matrix of such condiment dispersed in lipoidal material is intercepted with a spray of lipoidal material in fluent state directed for enveloping the condiment-rich spray particles, the enveloped particles thereafter being passed through a chilling zone and therein congealing the lipids for handling.

The present invention will be better understood by reference to the following examples which are provided as mere illustrations and should not be construed as limitations. In this specification all parts and percentages are by weight, all temperatures are in degrees Fahrenheit, and all mesh sizes are in United States Standard Sieve Series unless otherwise specified.

EXAMPLE I

Bland hydrogenated vegetable oil, Capillary M. P. specification of 124°–130°, was melted in a steam jacketed tank. The liquid temperature was maintained at 140° to 152°. Sufficient powdered 6xx sugar (about 60 mesh) was added to give a final concentration of about 40% sugar and 60% fat. The resulting slurry was agitated for about one hour to assure a homogeneous mixture. The slurry was then sprayed into conventional spray-chiller countercurrent to a stream of cold air. Solid particles of encapsulated sugar were collected from the bottom of the chiller.

A series of runs gave particles of the following average analysis:

| | |
|---|---|
| Fat | 58.5–59.4% |
| Sugar | 40.6–41.5% |
| Sieve Analysis | |
| Passes 20 mesh | 91.63% |
| Passes 40 mesh | 56.55% |
| Passes 50 mesh | 8.75% |
| Passes 80 mesh | 1.34% |
| Passes 150 mesh | 0 |

Encapsulation appeared to be virtually complete. The encapsulated sugar particles were white, free-flowing spherical beads.

EXAMPLE II

Several batches of coconut were compounded in a rotating-drum tumble food mixer using as the sweetening coating various mixtures of the spray-chilled, fat-encapsulated sugar particles of Example 1 and 6xx powdered sugar (sucrose). In each run the dessicated coconut was the same, namely shredded coconut; to it was added a mixture of three parts of propylene glycol and 17 parts water to obtain 20% water content in the final product; when this was sorbed, 0.5% salt was added, thus an edible coconut base particle was formed. Finally, to the coconut base particle the straight powdered sugar and encapsulated sugar was added. All mixing was done in the rotating-drum tumble mixer at room temperature. In each batch the proportion of total sugar to the coconut base particle was the same, 27 parts of total sucrose per 73 parts of coconut base particle (the salted, humidified dessicated coconut), but in the first batch 5% of it was encapsulated, in the second batch 15%, in the third 25%. Coloring and flavoring, if desired, is added prior to coating the coconut particles with the straight powdered sugar-/encapsulated sugar coating mixture.

In similar batch preparations it was noted that like fat-encapsulated sugar substitutions for straight powdered sugar whitened off-color coconut substantially more than did a comparable straight powdered sugar coating.

EXAMPLE III

A housewife taste panel test (30 housewives) was conducted using samples of the sweetened coconut described in Example II to determine if the panelists could detect a textural or sweetness formulation change between sweetened coconut comprising only straight powdered sugar as the sweetening agent on the one hand and sweetened coconut of the compositions described in Example II on the other. Sample No. 1 (20% moisture content) was a control, sweetened only with straight powdered sugar (6xx). Samples 2, 3, and 4, were from the first, second, and third batches of sweetened coconut of Example II, respectively.

The taste panel test was conducted through the use of an acceptance-difference type of sensory evaluation of the four samples unidentified. The panelists rated each sample separately on its acceptability. These results were translated into a scale of one to nine, the number one being assigned to a very low acceptance of the sample and the number nine being assigned to excellent acceptance of the sample. The following table displays results of the taste panel test:

| Characteristic | Sample 1 | Sample 2 | Sample 3 | Sample 4 |
|---|---|---|---|---|
| Appearance | 6.97 | 6.60 | 6.60 | 5.93 |
| Flavor | 4.27 | 6.07 | 5.93 | 5.77 |
| Texture | 6.33 | 6.57 | 6.57 | 5.97 |
| Overall Acceptance | 4.50 | 5.97 | 6.00 | 5.47 |
| Off-Flavor | 4.50 | 2.50 | 2.40 | 2.33 |

Test results above 5.00 generally indicate a preference for the sample. The greater the results are over 5.00, the greater the preference is. Because an off-flavor characteristic is not desired in the product, a result of 1.00 would be considered ideal for the off-flavor rating test.

The test results indicated that Samples 2, 3, and 4 (using various proportions of the fat-encapsulated sugar) were on the whole substantially more acceptable to the panel, with only statistically insignificant differences for the most part amongst the samples (note specifically the superior off-flavor performance of Samples 2, 3, and 4 versus Sample 1). The 25% substitution of fat-encapsulated sugar for the straight powdered sugar here appeared to be about the threshold value, that is minimum textural perception reaction by the panel.

The samples were also evaluated by this panel as to their relative moistness content and sweetness. Those results follow in the table below:

| Moistness | Sample 1 | Sample 2 | Sample 3 | Sample 4 |
|---|---|---|---|---|
| "Too Dry" | 10% | 13% | 10% | 0% |
| "About Right" | 77% | 60% | 77% | 67% |
| "Too Moist" | 13% | 27% | 13% | 33% |
| Sweetness | | | | |
| "Not Enough" | 57% | 33% | 13% | 13% |
| "About Right" | 43% | 50% | 80% | 60% |
| "Too Sweet" | 0% | 17% | 7% | 27% |

The foregoing table shows the generally good palatability of the inventive coconut in competition with conventional sweetened account.

EXAMPLE IV

Another taste panel (30 housewives) tested samples of the sweetened coconut of Example II and one additional sample to determine how the inventive coconut rated as a topping on a cupcake frosted with white icing. The cupcakes were substantially identical except that cake 1 had a topping of Sample 1 of Example III, cake 2 had a topping like Sample 1 of Example III but with water content of only 14%, cake 3 had a topping of Sample 2 of Example III, cake 4 had a topping of Sample 3 of Example III and cake 5 had a topping of Sample 4 of Example III. These toppings weighed about the same.

The samples were evaluated in the same manner as described in the taste test of Example III above. The results of this taste test are given in the table below:

| Characteristic | Cake 1 | Cake 2 | Cake 3 | Cake 4 | Cake 5 |
|---|---|---|---|---|---|
| Appearance | 6.51 | 6.83 | 6.46 | 6.34 | 6.17 |
| Flavor | 6.39 | 7.19 | 6.54 | 6.41 | 6.74 |
| Texture | 6.63 | 7.19 | 6.28 | 6.48 | 6.48 |
| Overall Acceptance | 6.32 | 7.26 | 6.46 | 6.48 | 6.66 |
| Off-Flavor | 1.53 | 1.31 | 1.38 | 1.20 | 1.36 |

The above test results demonstrate that an edible sweetened coconut product comprising up to a 25% replacement of powdered sugar with fat encapsulated sugar as the sweetening agent can be used with a carrier still maintaining excellent appearance, flavor, texture, and overall acceptance while substantially diminishing off-flavor in the coconut product. The replacement of fat-encapsulated sugar for the straight powdered sugar even in cake 5 appeared to be well below any threshold value.

The above cakes were also evaluated as to the moistness and sweetness of the coconut in this food. The following table displays the results obtained:

| Moisture | Cake 1 | Cake 2 | Cake 3 | Cake 4 | Cake 5 |
|---|---|---|---|---|---|
| "Too Dry" | 0% | 0% | 22% | 17% | 16% |
| "About Right" | 89% | 89% | 78% | 72% | 78% |
| "Too Moist" | 11% | 11% | 0% | 11% | 6% |
| Sweetness | | | | | |
| "Not Enough" | 11% | 11% | 16% | 28% | 22% |
| "About Right" | 78% | 83% | 78% | 67% | 72% |
| "Too Much" | 11% | 6% | 6% | 5% | 6% |

The above results demonstrate the acceptance of the inventive coconut in competition with conventionally sweetened coconut.

EXAMPLE V

The sweetened coconut product samples of Example II were test-filled through two different conventional automatic packaging machines. The first packaging machine handled routinely sweetened coconut of 9–10% water content when coated with straight powdered sugar. The second packaging machine handled routinely sweetened coconut of about 13% to 14% water content when coated with straight powdered sugar. The sweetened coconut with 5%, 15%, and 25% replacement of straight powdered sugar with fat-encapsulated sugar was successfully test-filled through both packaging machines with increased water content in the coconut fill. The water content of the sweetened coconut was increased to 13%–14% on the first-packaging machine and to 18% for the second packaging machine. The sweetened coconut with the fat encapsulated sugar comprising a part of the sweetening coating mixture exhibited reduced stickiness characteristics of the coconut filling at the increased water levels while maintaining practical and rapid filling flow rates.

We claim:

1. An improved sweetened coconut product comprising an edible coconut base particle which is coated with a mixture of powdered sugar particles and particles of sugar encapsulated in edible fat, the proportion of sugar in said encapsulated sugar particles constituting at least about 5% of the total sugar content of said coating mixture and the proportion of said encapsulated particles not substantially in excess of that proportion which will impart a threshold textural difference to the product, the maximum particle size of the preponderance of said encapsulated sugar particles being restricted to about four times the maximum particle size of said powdered sugar particles.

2. The coconut product of claim 1 wherein the proportion of sugar in said edible fat-encapsulated sugar particles being about 30%–50% by weight of said particles.

3. The coconut product of claim 1 wherein the water content is above that of a conventional counterpart coconut product made without said particles of encapsulated sugar, but not appreciably stickier than said counterpart product by dint of said increased water content.

4. The coconut product of claim 1 wherein said edible fat is a normally hard edible fat.

5. The coconut product of claim 4 wherein said normally hard edible fat has a Capillary Melting Point of from about 110°F. to about 130°F.

6. In a process for making a sweetened coconut product coated with powdered sugar particles, the improvement which comprises substituting, for a substantial fraction of said powdered sugar particles, particles of sugar encapsulated in edible fat, the proportion of said encapsulated particles being not substantially in excess of that proportion which will impart a threshold textural difference to the product, and the maximum particle size of the preponderance of said encapsulated sugar particles being not substantially above about 4 times the maximum particle size of said powdered sugar particles.

7. The process of claim 6 wherein said edible fat is a normally hard edible fat.

8. The process of claim 7 wherein said normally hard edible fat has a Capillary Melting Point of from about 110°F. to about 130°F.

* * * * *

UNITED STATES PATENT AND TRADEMARK OFFICE
CERTIFICATE OF CORRECTION

PATENT NO. : 3,976,794
DATED : August 24, 1976
INVENTOR(S) : Lawrence A. Johnson and Larry A. Walters It is certified that error appears in the above-identified patent and that said Letters Patent are hereby corrected as shown below:

Column 1, line 16, delete "form" and insert therefor -- from -- .
Column 3, line 8, delete "normaly" and insert therefor -- normally -- .
Column 3, line 55, delete "if" and insert therefor -- is -- .
Column 4, line 15, delete "mush" and insert therefor -- much --.
Column 5, line 48, delete "50" and insert therefor -- 60 -- .
Column 8, line 29, after "particles" insert -- constituting -- .

Signed and Sealed this

Ninth Day of November 1976

[SEAL]

Attest:

RUTH C. MASON
Attesting Officer

C. MARSHALL DANN
Commissioner of Patents and Trademarks